(12) United States Patent
Vadugappatty Srinivasan et al.

(10) Patent No.: US 11,891,912 B2
(45) Date of Patent: Feb. 6, 2024

(54) METHOD OF METAL WORK REPAIR IN HYBRID COMPOSITE BLADES

(71) Applicant: ROLLS-ROYCE plc, London (GB)

(72) Inventors: Dharun Vadugappatty Srinivasan, Singapore (SG); Sridhar Idapalapati, Singapore (SG)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 17/931,152

(22) Filed: Sep. 12, 2022

(65) Prior Publication Data

US 2023/0093834 A1 Mar. 30, 2023

(30) Foreign Application Priority Data

Sep. 28, 2021 (GB) ..................................... 2113817

(51) Int. Cl.
  B23P 6/00 (2006.01)
  F01D 5/00 (2006.01)
  (Continued)

(52) U.S. Cl.
  CPC .............. F01D 5/005 (2013.01); B23P 6/002 (2013.01); B23P 6/045 (2013.01); B29C 73/10 (2013.01);
  (Continued)

(58) Field of Classification Search
  CPC .. B23P 6/002; B23P 6/04; B23P 6/045; F01D 5/005
  See application file for complete search history.

(56) References Cited

U.S. PATENT DOCUMENTS

| 7,841,834 | B1 * | 11/2010 | Ryznic | F04D 29/023 |
|           |      |         |        | 416/224 |
| 8,851,421 | B2 * | 10/2014 | Jevons | F04D 29/324 |
|           |      |         |        | 244/123.1 |

(Continued)

FOREIGN PATENT DOCUMENTS

| EP | 2528710 B1 | 6/2018 |
| FR | 2994717 A1 | 2/2014 |
| FR | 3093017 A1 | 8/2020 |

OTHER PUBLICATIONS

European search report dated Feb. 15, 2023, issued in EP Patent Application No. 22192729.6.
(Continued)

*Primary Examiner* — Sarang Afzali

(57) ABSTRACT

A method of repairing a composite blade. The composite blade includes a metal work bonded to a composite part through an adhesive layer. The method includes determining a locally damaged portion of the metal work, and removing a bullet portion corresponding to the locally damaged portion. The method further includes detaching, debonding, and removing a first wing portion from the composite part to obtain a first exposed surface portion. The method further includes detaching, debonding, and removing a second wing portion from the composite part to obtain a second exposed surface portion. The method further includes reconditioning the first and second exposed surface portions to obtain first and second reconditioned surface portions, respectively, and applying first and second adhesive layers to the first and second reconditioned surface portions respectively. The method further includes bonding a metal work patch to the first and second adhesive layers.

15 Claims, 11 Drawing Sheets

(51) Int. Cl.
  *B29C 73/10* (2006.01)
  *B29C 73/26* (2006.01)
  *F01D 5/28* (2006.01)
  *B23P 6/04* (2006.01)
  *B29L 31/08* (2006.01)

(52) U.S. Cl.
  CPC .............. *B29C 73/26* (2013.01); *F01D 5/282* (2013.01); *B29C 2073/264* (2013.01); *B29L 2031/082* (2013.01); *F05D 2230/10* (2013.01); *F05D 2230/23* (2013.01); *F05D 2230/80* (2013.01); *F05D 2300/603* (2013.01)

(56) References Cited

U.S. PATENT DOCUMENTS

| | | | | |
|---|---|---|---|---|
| 10,539,027 | B2 * | 1/2020 | Read | F01D 9/02 |
| 10,744,747 | B2 * | 8/2020 | Gruner | B32B 43/00 |
| 10,927,684 | B2 * | 2/2021 | Bogue | C23C 28/3215 |
| 11,286,776 | B2 * | 3/2022 | Charlas | F01D 5/282 |
| 2012/0156049 | A1 | 6/2012 | Hong | |
| 2017/0029088 | A1 | 2/2017 | Gruner et al. | |
| 2019/0383143 | A1 | 12/2019 | Charlas | |

OTHER PUBLICATIONS

Great Britain search report dated Mar. 14, 2022, issued in GB Patent Application No. 2113817.7.

* cited by examiner

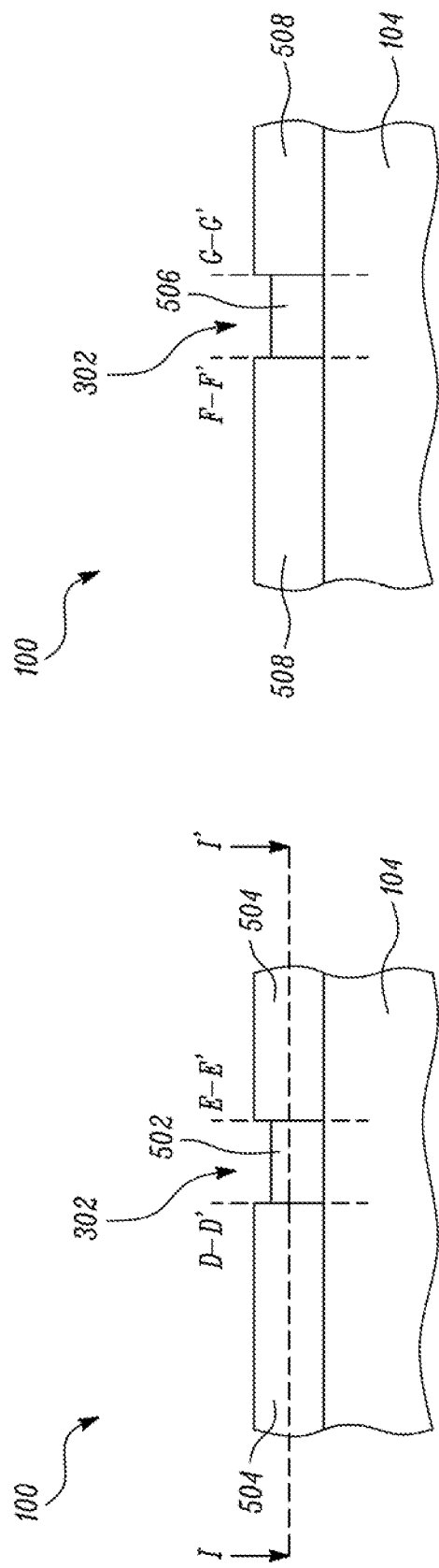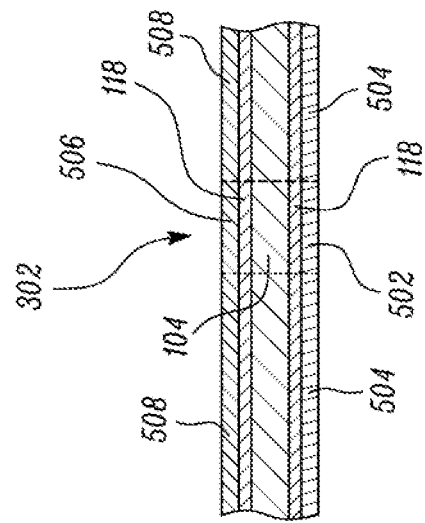

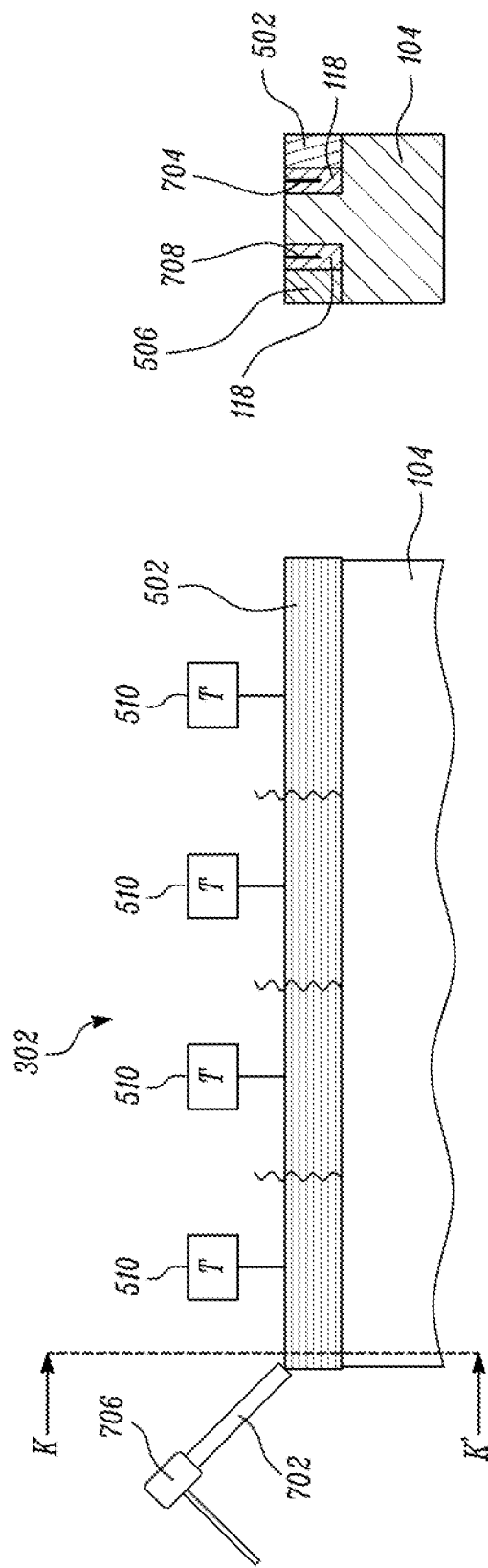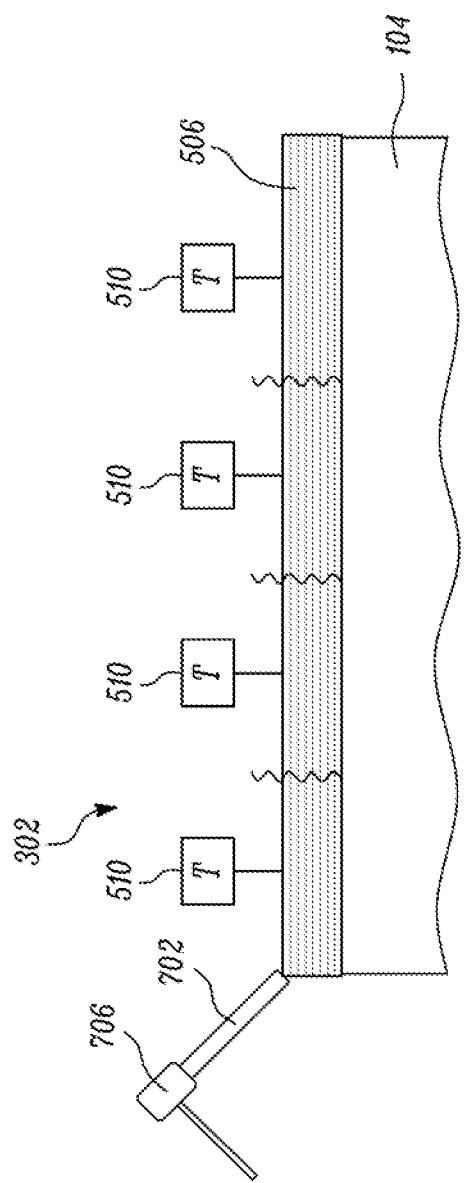

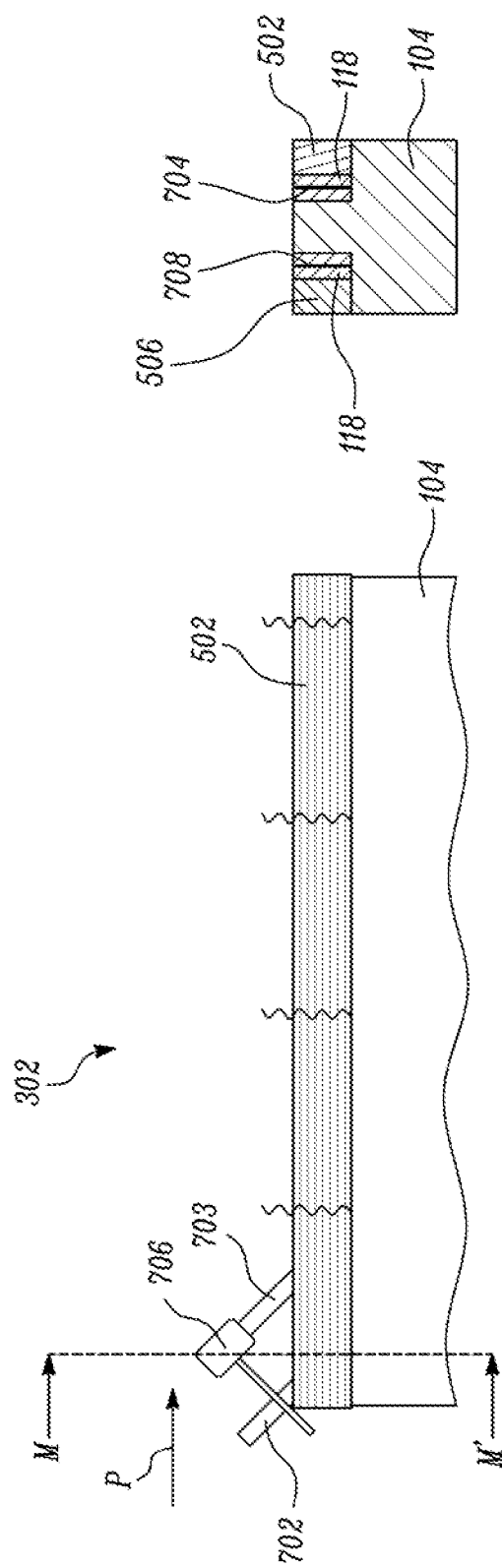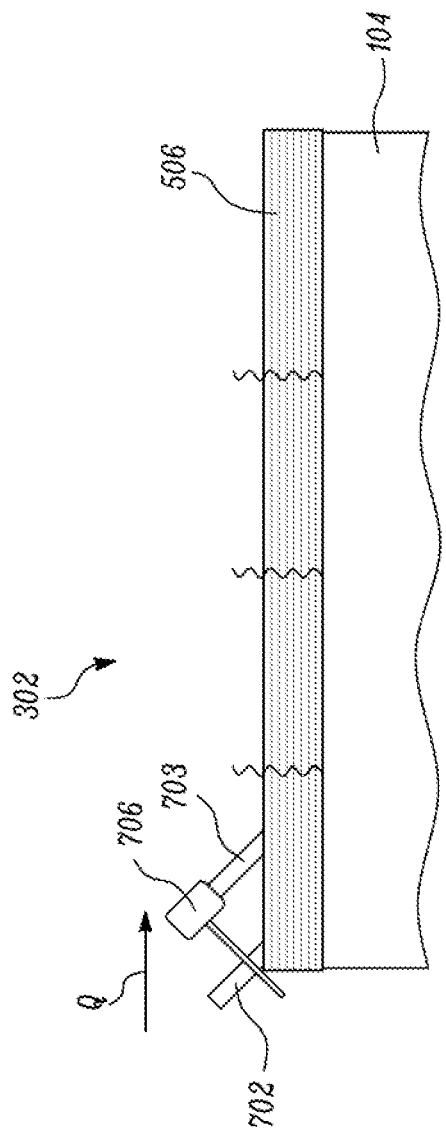

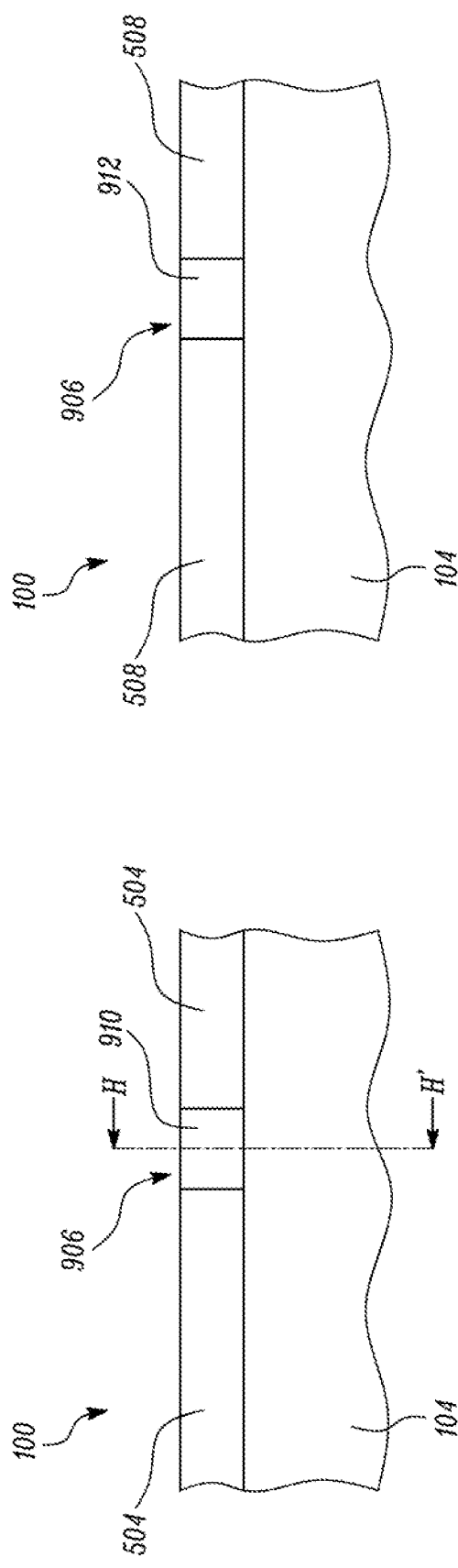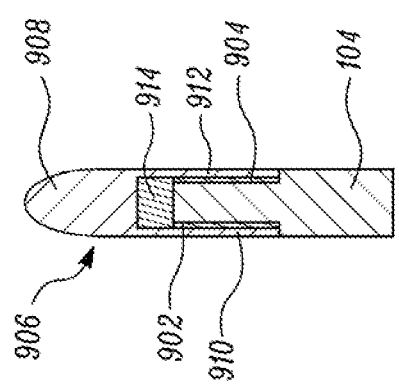

METHOD OF METAL WORK REPAIR IN HYBRID COMPOSITE BLADES

CROSS-REFERENCE TO RELATED APPLICATIONS

This specification is based upon and claims the benefit of priority from United Kingdom patent application number GB 2113817.7 filed on Sep. 28, 2021, the entire contents of which is incorporated herein by reference.

BACKGROUND

Technical Field

The present disclosure relates to a method of metal work repair in a hybrid composite blade.

Description of the Related Art

Blades are often utilized in equipment such as gas turbine engines. To minimize engine weight while optimizing performance, it is often preferred to use composite blades made from strong but lightweight materials. Conventional composite blades typically include a blade body made of a composite material to which an edge made of a metallic material (e.g., a titanium alloy) is bonded.

Composite blades are susceptible to foreign object damage. Many types of foreign objects may be entrained in an inlet of the engine ranging from large birds, such as seagulls, to hailstones and sand. Smaller objects may erode the blade material and degrade the aerodynamic performance of the engine. Impact by larger objects may rupture or pierce the blades with impacted portions being torn. For example, the metallic material may erode or disbond locally over time during service requiring replacement or repair at times based on an extent of damage. Additionally, tip-rub damages that typically occur when blade tips rub against an adjacent nacelle surface (e.g., during landing of an aircraft) may also impact the edge of the composite blades. The damage level ranges from localized dent in the metallic material to underlying composite material damage.

Conventional repair methods typically involve replacement of the entire metallic material, even for localized damages. In most cases, the metallic material may only need dressing repair rather than total discard. Removing the entire metallic material in the event of localized dent/damage/disbonding is generally not an economically attractive option due to cost of the metallic material (e.g., titanium alloy). Further, conventional repair methods generally include use of sophisticated tools and complex debonding processes for replacement of the metallic material.

SUMMARY

According to a first aspect there is provided a method of repairing a composite blade. The composite blade includes a composite part, a metal work, and an adhesive layer bonding the metal work to the composite part. The metal work includes a bullet forming a leading edge of the blade. A first wing extends from the bullet. A second wing extends from the bullet opposing the first wing. The method includes determining a locally damaged portion of the metal work. The method further includes removing a bullet portion corresponding to the locally damaged portion from a rest of the bullet. The method further includes detaching a first wing portion corresponding to the locally damaged portion from a rest of the first wing. The method further includes detaching a second wing portion corresponding to the locally damaged portion from a rest of the second wing. The method further includes debonding and removing the first wing portion from the composite part to obtain a first exposed surface portion of the composite part. The method further includes debonding and removing the second wing portion from the composite part to obtain a second exposed surface portion of the composite part. The method further includes reconditioning the first exposed surface portion of the composite part to obtain a first reconditioned surface portion of the composite part. The method further includes reconditioning the second exposed surface portion of the composite part to obtain a second reconditioned surface portion of the composite part. The method further includes applying a first adhesive layer to the first reconditioned surface. The method further includes applying a second adhesive layer to the second reconditioned surface. The method further includes bonding a metal work patch to the first adhesive layer and the second adhesive layer. The metal work patch includes a bullet part corresponding to the bullet portion, a first wing part corresponding to the first wing portion, and a second wing part corresponding to the second wing portion.

The proposed method may allow localized repair of the composite blade, thus avoiding replacement of the entire metal work. Further, an adhesively bonded region is typically smaller when repairing locally allowing manual debonding of the metal work. Such manual debonding may eliminate the use of sophisticated tools or complex debonding processes. Additionally, localized repair of the composite blade may reduce a cost and time involved in repairing the composite blade while also saving material costs by salvaging the undamaged metal work and the composite part.

In some embodiments, the method further includes applying an adhesive tape adjacent to the locally damaged portion to highlight the locally damaged portion. The adhesive tape may preserve protective coating layers disposed on the undamaged metal work.

In some embodiments, removing the bullet portion further includes cutting the bullet portion from the rest of the bullet. Removing the bullet portion may allow access to the underlying adhesive layer for debonding.

In some embodiments, detaching the first wing portion further includes cutting the first wing portion from the rest of the first wing while leaving the composite part intact.

In some embodiments, detaching the second wing portion further includes cutting the second wing portion from the rest of the second wing while leaving the composite part intact.

In some embodiments, debonding and removing the first wing portion further includes heating at least the first wing portion to a temperature equal to or above a predetermined threshold temperature. In some embodiments, debonding and removing the second wing portion further includes heating at least the second wing portion to a temperature equal to or above the predetermined threshold temperature. Heating at least the first wing portion and at least the second wing portion may reduce an adhesive strength of the underlying adhesive layer.

In some embodiments, debonding and removing the first wing portion further includes initiating, using a sharp-edged tool, a crack in the adhesive layer disposed adjacent to the first wing portion. In some embodiments, debonding and removing the first wing portion further includes debonding, using the sharp-edged tool, the first wing portion from the composite part.

In some embodiments, debonding and removing the second wing portion further includes initiating, using the sharp-edged tool, a crack in the adhesive layer disposed adjacent to the second wing portion. In some embodiments, debonding and removing the second wing portion further includes debonding, using the sharp-edged tool, the second wing portion from the composite part.

In some embodiments, initiating the crack in the adhesive layer disposed adjacent to the first wing portion or the second wing portion further includes using a mallet to strike the sharp-edged tool. Localised cleavage stresses are generated in the adhesive layer disposed adjacent to the first wing portion or the second wing portion by forcing the sharp-edged tool through the corresponding adhesive layer with low impact force.

In some embodiments, debonding the first wing portion or the second wing portion from the composite part further includes progressively inserting the sharp-edged tool in the adhesive layer disposed adjacent to the corresponding first wing portion or the second wing so as to debond the first wing portion or the second wing portion from the composite part.

In some embodiments, the sharp-edged tool is a chisel made of at least one of a metal, a plastic, and an elastomer.

In some embodiments, reconditioning the first exposed surface portion further includes removing any residual adhesive layer from the first exposed surface portion.

In some embodiments, reconditioning the second exposed surface portion further includes removing any residual adhesive layer from the second exposed surface portion.

In some embodiments, reconditioning the first exposed surface portion or the second exposed surface portion further includes applying a mixture comprising an adhesive and at least one volatile solvent to the first exposed surface portion or the second exposed surface portion. In some embodiments, reconditioning the first exposed surface portion or the second exposed surface portion further includes heating the first exposed surface portion or the second exposed surface portion to eliminate the at least one volatile solvent. The mixture may fill an uneven surface of the first and second exposed surface portions to obtain the corresponding first and second reconditioned surface portions.

In some embodiments, bonding the metal work patch to the first adhesive layer and the second adhesive layer further includes curing the first adhesive layer and the second adhesive layer. Curing may allow the first adhesive layer and the second adhesive layer to attain their final adhesive properties.

In a second aspect there is provided a composite blade that has a metal work repaired by the method of the first aspect.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the Figures, in which:

FIG. 5A is a schematic front view of a portion of the composite blade of FIG. 3 including a locally damaged portion with a bullet portion removed;

FIG. 5B is a schematic rear view of a portion of the composite blade of FIG. 3 including the locally damaged portion with the bullet portion removed;

FIG. 5C is a schematic sectional view of a portion of the composite blade taken along a section line I-I' shown in FIG. 5A;

FIG. 7A is a schematic front view of the locally damaged portion where the first wing portion is debonded and removed by initiating a crack in an adhesive layer disposed adjacent to the first wing portion using a sharp-edged tool;

FIG. 7B is a schematic sectional view of the locally damaged portion taken along a section line K-K' shown in FIG. 7A;

FIG. 7C is a schematic rear view of the locally damaged portion where the second wing portion is debonded and removed by initiating a crack in the adhesive layer disposed adjacent to the second wing portion using the sharp-edged tool;

FIG. 8A is a schematic front view of the locally damaged portion where the first wing portion is debonded and removed by progressively inserting the sharp-edged tool in the adhesive layer disposed adjacent to the first wing portion;

FIG. 8B is a schematic sectional view of the locally damaged portion taken along a section line M-M' shown in FIG. 8A;

FIG. 8C is a schematic rear view of the locally damaged portion where the second wing portion is debonded and removed by progressively inserting the sharp-edged tool in the adhesive layer disposed adjacent to the second wing portion;

FIGS. 11A and 11B are schematic front and rear views, respectively, of a portion of the composite blade where a metal work patch is bonded to the first and second adhesive layers; and FIG. 11C is a partial sectional view of a metal work patch and a composite part taken along a section line H-H' shown in FIG. 11A.

Figure 1B:
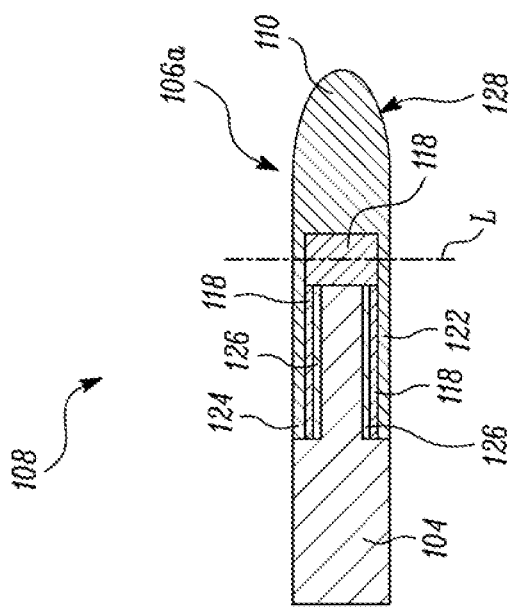
FIG. 1B is a partial sectional view of a leading edge of the composite blade of FIG. 1A taken along a section line A-A' shown in FIG. 1A.

The following table lists the reference numerals used in the drawings with the features to which they refer:

| Ref no. | Feature |
|---|---|
| 100 | Composite blade |
| 102 | Concave curved surface |
| 104 | Composite part |
| 106 (a, b) | Metal work |
| 108 | Leading edge |
| 110 | Bullet |
| 112 | Trailing edge |
| 114 | Tip edge |
| 116 | Root |
| 118 | Adhesive layer |
| 122 | First wing |
| 124 | Second wing |
| 126 | Elastomer layer |
| 128 | Polyurethane coating |
| 200 | Method |
| 202 | Step |
| 204 | Step |
| 206 | Step |
| 208 | Step |
| 210 | Step |
| 212 | Step |
| 214 | Step |
| 216 | Step |
| 218 | Step |
| 220 | Step |
| 222 | Step |
| 302 | Locally damaged portion |
| 304 | Adhesive tape |
| 402 | Bullet portion |
| 404 | Rest of the bullet |
| 406 | Outer end |
| 408 | Outermost edge |
| 502 | First wing portion |
| 504 | Rest of the first wing |
| 506 | Second wing portion |
| 508 | Rest of the second wing |
| 510 | Thermocouples |
| 602 | First exposed surface portion |
| 604 | Second exposed surface portion |
| 702 | Tool |
| 703 | Tool |
| 704 | Crack |
| 706 | Mallet |
| 708 | Crack |
| 802 | First reconditioned surface portion |
| 804 | Residual adhesive layer |
| 806 | Second reconditioned surface portion |
| 808 | Residual adhesive layer |
| 902 | First adhesive layer |
| 904 | Second adhesive layer |
| 906 | Metal work patch |
| 908 | Bullet part |
| 910 | First wing part |
| 912 | Second wing part |
| 914 | Adhesive layer |
| A-A' | Section line |
| B-B' | Section line |
| C-C' | Line |
| D-D' | Line |
| E-E' | Line |
| F-F' | Line |
| G-G' | Line |
| H-H' | Section line |
| I-I' | Section line |
| K-K' | Section line |
| M-M' | Section line |
| L | Line |
| P | Direction |
| Q | Direction |
| T | Predetermined threshold temperature |

DETAILED DESCRIPTION

Aspects and embodiments of the present disclosure will now be discussed with reference to the accompanying figures. Further aspects and embodiments will be apparent to those skilled in the art.

Figure 1A:
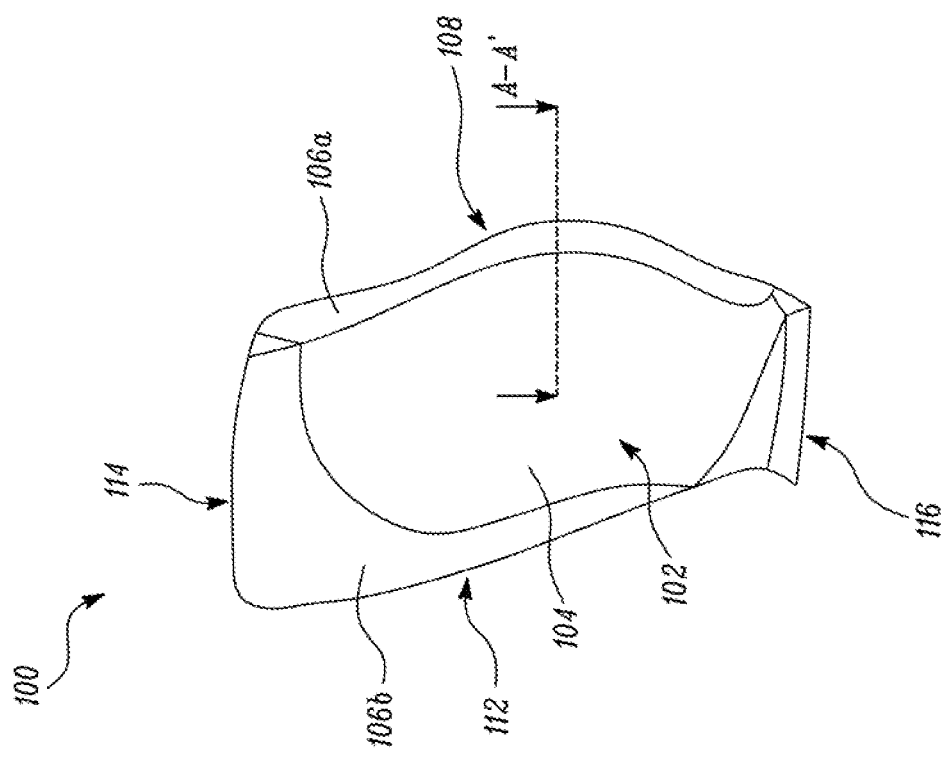
FIG. 1A is a schematic front view of a composite blade.

FIG. 1A illustrates a schematic front view of a composite blade 100. Specifically, FIG. 1A illustrates a concave curved surface 102 of the composite blade 100 (also generally referred to as the "pressure" side of the composite blade 100). The composite blade 100 includes a composite part 104 and a metal work 106a, 106b (collectively, metal work 106). The composite blade 100 further includes a leading edge 108, a trailing edge 112, a tip edge 114 and a root 116.

In some embodiments, the composite blade 100 may be a part of a gas turbine engine (not shown). For example, the composite blade 100 may represent a turbine fan blade. However, it should be understood that the composite blade 100 is equally applicable to other aerofoils, including vanes, propellers, rotor blades (e.g., for helicopters), as well as other types of turbine blades that includes a composite blade.

In some embodiments, the composite part 104 may be made of a composite material (i.e., two or more materials combined together), generally containing a reinforcement, such as tapes, fibres or particles supported in a binder or a matrix material (e.g., a resin), for example, a carbon fibre reinforced polymer (CFRP). In some embodiments, multiple composite materials may be used in the composite part 104, including both metallic and non-metallic composites. Composites useful as composite part 104 may typically be of the non-metallic type and may be made of a material containing a fibre, such as a carbonaceous, silica, metal, metal oxide, or ceramic fibre embedded in a resin material, such as epoxy, PMR15, BMI, PEEK, etc., or a unidirectional tape material in an epoxy resin matrix. In some embodiments, fibres (or tape) may be impregnated with the resin and may be formed into suitable blade shape, and then cured via an autoclaving process or press moulding to form a light weight, stiff, relatively homogeneous composite part 104.

In some embodiments, the metal work 106a, 106b is adhered or attached to the composite part 104, typically using an appropriate adhesive (e.g., an epoxy adhesive). The metal work 106a is shown as being positioned at or along the leading edge 108. The metal work 106b is shown as being positioned at or along the trailing edge 112 and at least a portion of the tip edge 114. The metal work 106a, 106b may protect corresponding edges of the composite part 104.

In some embodiments, the metal work 106a, 106b may include a variety of metals (or metal alloys), including, but not limited to, titanium, steel, nickel, tungsten, and alloys thereof. This metal work 106a, 106b may be fabricated to precisely achieve desired aerofoil contours for the composite blade 100 or may be fabricated as formed sheet metal elements. A composition of the metal work 106a, 106b may also vary depending on where the metal work 106a, 106b is positioned on the composite blade 100. For example, the metal work 106a that is positioned at or along the leading edge 108 may typically need to be stronger and may be made from a relatively stronger metal or metal alloy, such as a titanium alloy. By contrast, the metal work 106b positioned at or along the trailing edge 112 and at least a portion of the tip edge 114 may need not be as strong and may be made from a relatively less strong metal or metal alloy, such as commercially pure titanium.

FIG. 1B illustrates a partial sectional view of the leading edge 108 of the composite blade 100 taken along a section line A-A' shown in FIG. 1A. Referring now to FIGS. 1A and 1B, the metal work 106a includes a bullet 110 forming the leading edge 108 of the composite blade 100.

A first wing 122 extends from the bullet 110. A second wing 124 extends from the bullet 110 opposing the first wing 122. The first wing 122 and the second wing 124 extend over corresponding surfaces of the composite blade 100. In some embodiments, the first wing 122 forms a portion of the "pressure" side of the composite blade 100 and the second wing 124 forms a portion of a "suction" side of the composite blade 100 opposite the "pressure" side. In the embodiment being described, the bullet 110, the first wing 122, and the second wing 124 are formed integrally. In other words, the leading edge 108 of the composite blade 100 is provided as a single piece component.

In some embodiments, the first wing 122 may be identical to the second wing 124. In some other embodiments, the first wing 122 on the "pressure" side of the composite blade 100 may be thicker than the second wing 124 on the "suction" side of the composite blade 100. Further, the first wing 122 on the "pressure" side of the composite blade 100 may also be wider than the second wing 124 on the "suction" side of the composite blade 100, extending further across the "pressure" side of the composite blade 100. It should be understood that a shape and configuration of the composite blade 100, the bullet 110, and the first and second wings 122, 124 may vary based on application requirements.

In the embodiment being described, the first and second wings 122, 124 are bonded to the composite part 104 across the entire width of the first and second wings 122, 124. In alternative embodiments, only a portion of the width of each of the first and second wings 122, 124 may be bonded to the composite part 104. An adhesive layer 118 bonds the metal work 106a, 106b to the composite part 104. The adhesive layer 118 forms a layer on each side of the composite blade 100, between the composite part 104 and the first and second wings 122, 124.

In some embodiments, the adhesive layer 118 may be a thin layer disposed adjacent to the first and second wings 122, 124 and the composite part 104 may have at least substantially constant thickness. The adhesive layer 118 may also extend between an outer end of the composite part 104 and the bullet 110. This may accommodate for any dimensional variations over a length of the composite blade 100. Line L in FIG. 1B approximately indicates a location of the outer end of the composite part 104. The adhesive layer 118 between the outer end of the composite part 104 and the bullet 110 may be thicker than the adhesive layer 118 between the composite part 104 and the first and second wings 122, 124.

In some embodiments, the adhesive layer 118 may include an epoxy adhesive with a glass transition temperature of between about 100° C. and about 180° C. A skilled person will appreciate that different adhesives may be utilized with the composite blades 100 based on application requirements. In the embodiment being described, an elastomer layer 126 is disposed on each side of the composite blade 100 between the composite part 104 and the adhesive layer 118. Further, a polyurethane coating 128 may be disposed on an outer surface of the metal work 106a opposite the composite part 104.

It should be understood that the components of the leading edge 108 described above with reference to FIG. 1B are equally applicable to the metal work 106b on the trailing edge 112 and the tip edge 114 of the composite blade 100.

A skilled person will appreciate that the metal work 106a, 106b may be damaged due to erosion, abrasion and impact damages, leading to a need for repairing the metal work 106a, 106b. Further, the metal work 106a, 106b may be damaged locally during an operational life of the composite blade 100. Additionally, a skilled person will appreciate that the composite part 104 is less likely to be damaged by impacts due to protective covering provided by the metal work 106a, 106b and the like, and therefore, may be re-used if the metal work 106a, 106b may be repaired with minimal or no damage to the composite part 104. Further, it may also be possible to re-use the composite blade 100 by repairing localized damages on the metal work 106a, 106b.

Embodiments are described hereinafter in detail for repairing a locally damaged portion of the composite blade 100. A skilled person will appreciate that the methods and tools described hereinafter are not limited to this use only, and that composite blade 100 is described by way of an example of an object to be repaired locally using the described methods and tools.

Figure 2:
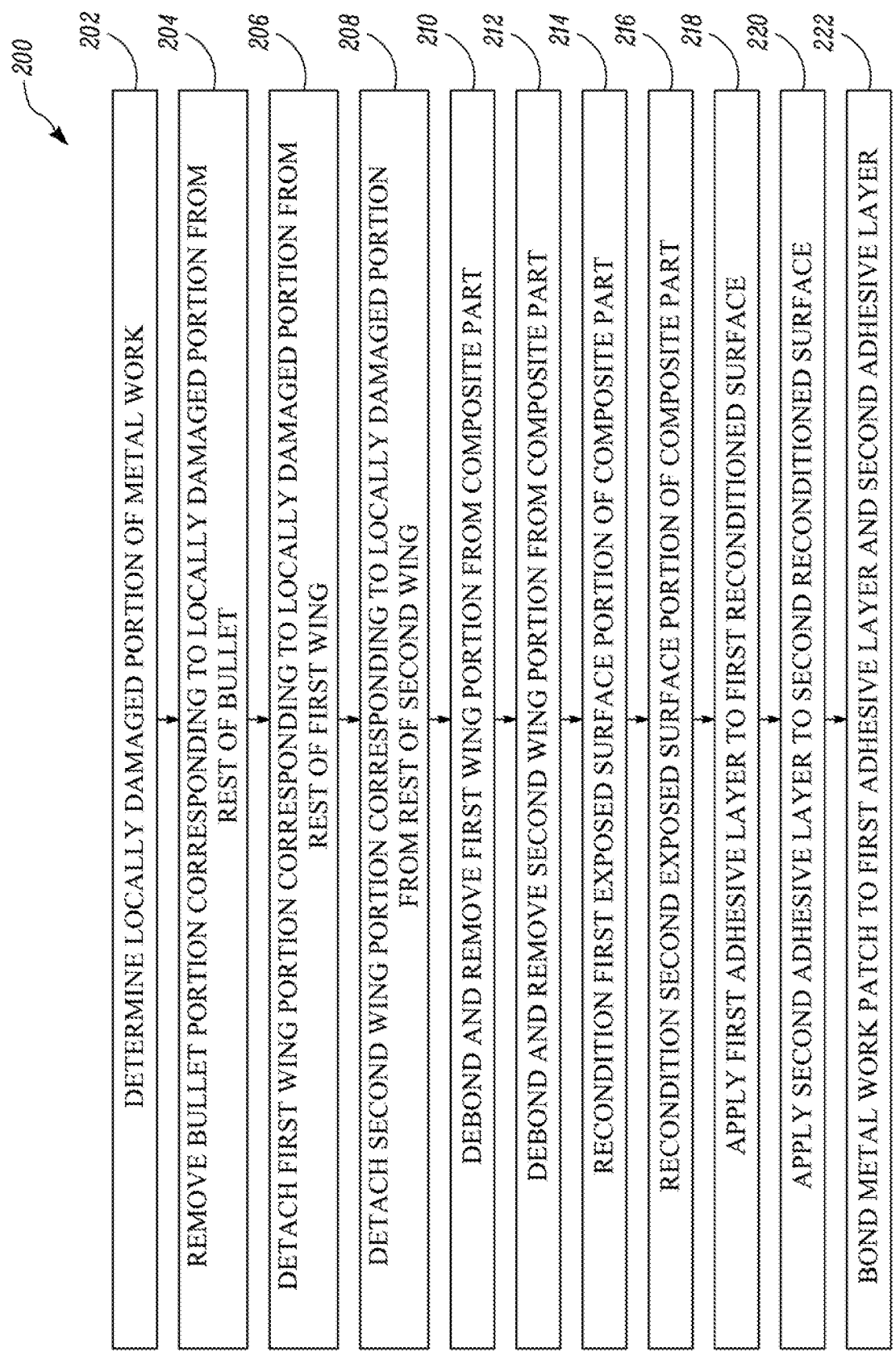
FIG. 2 is flow chart illustrating a method of repairing the composite blade of FIG. 1A.

FIG. 2 is a flow chart illustrating an exemplary method 200 of repairing a composite blade. In some embodiments, the composite blade may be similar to the composite blade 100 shown in FIG. 1A. The method 200 will be described with reference to the composite blade 100 of FIGS. 1A and FIGS. 3-11C.

Figure 3:
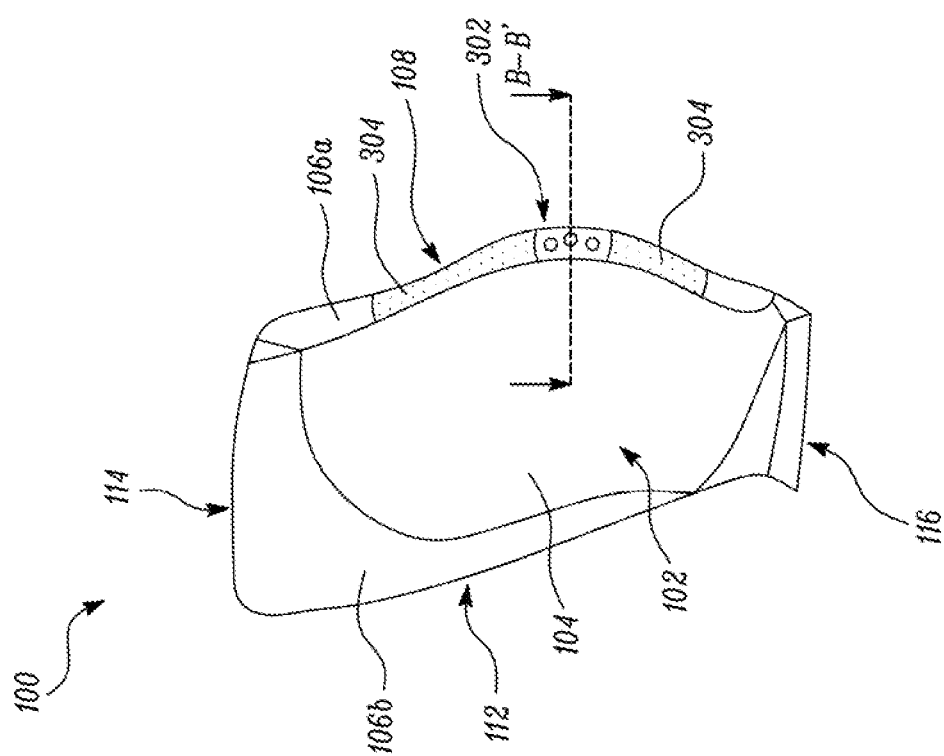
FIG. 3 is a schematic front view of the composite blade of FIG. 1A but with a locally damaged portion requiring repair.

FIG. 3 illustrates a schematic front view of the composite blade 100 but with a damaged portion requiring repair. Referring now to FIGS. 2 and 3, at step 202, the method 200 includes determining a locally damaged portion 302 of the metal work 106a, 106b. In the illustrated example of FIG. 3, the locally damaged portion 302 is schematically shown on the metal work 106a. However, the locally damaged portion 302 may be present anywhere on the metal work 106a, 106b.

In some embodiments, the locally damaged portion 302 may be determined based on various known techniques, e.g., non-destructive testing (NDT) methods such as visual inspection, dye penetrant inspection (DP), inspection using radiography, ultrasounds, etc. Such techniques may be implemented during regular maintenance of the composite blades 100. It should be understood that any other known testing methods may be utilized for determining a location and extent of the locally damaged portion 302.

In some embodiments, the method 200 further includes applying an adhesive tape 304 adjacent to the locally damaged portion 302 to highlight the locally damaged portion 302. For example, the adhesive tape 304 may be applied at least partially to a rest of the metal work 106a, 106b adjacent the locally damaged portion 302 so as to allow further processing of the locally damaged portion 302 without damaging a polyurethane coating (e.g., the polyurethane coating 128) of the rest of the metal work 106a, 106b. In some embodiments, the adhesive tape 304 may include a scratch free, special adhesive tape that may be easily removed without damaging the polyurethane coating on the rest of the metal work 106a, 106b.

Figure 4:
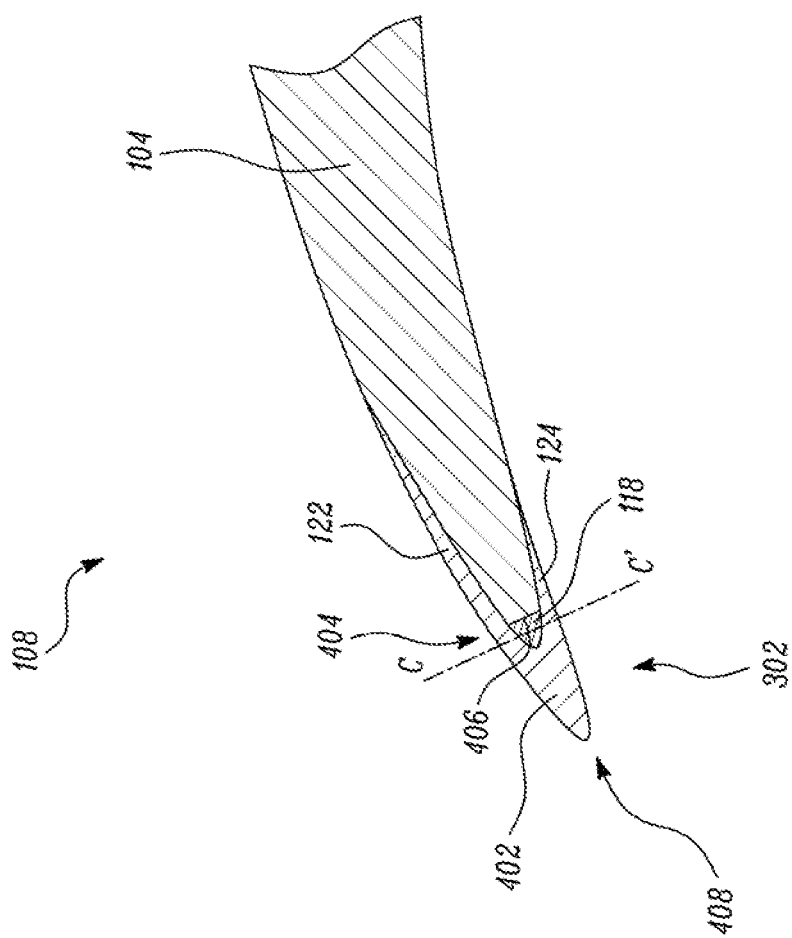
FIG. 4 is a partial sectional view of a leading edge of the composite blade of FIG. 3 taken along a section line B-B' shown in FIG. 3.

FIG. 4 illustrates a partial sectional view of the leading edge 108 of the composite blade 100 corresponding to the locally damaged portion 302 taken along a section line B-B' shown in FIG. 3. Some components of the composite blade 100 are not shown for clarity. Referring now to FIGS. 2 and 4, at step 204, the method 200 further includes removing a bullet portion 402 corresponding to the locally damaged portion 302 from a rest of the bullet 404. In some embodiments, removing the bullet portion 402 further includes cutting the bullet portion 402 from the rest of the bullet 404.

In the illustrated example of FIG. 4, the bullet portion 402 is removed corresponding to the locally damaged portion 302 by cutting the bullet portion 402 along a line C-C' passing through the adhesive layer 118 disposed between an outer end 406 of the composite part 104 and the bullet portion 402. In general, the bullet portion 402 may represent a thin layer of metal correspond to an outermost edge 408 of the leading edge 108. Further, the line C-C' may always pass through the adhesive layer 118 and the bullet portion 402 may always be cut above the composite part 104 to be able to re-use the composite part 104 and repair the composite blade 100 accordingly. Therefore, the composite part 104 is left intact while cutting the bullet portion 402.

In some embodiments, a selective depth cutting method may be utilized for removing the bullet portion 402 from the rest of the bullet 404 such that only the bullet portion 402 is removed leaving the composite part 104 intact. The cutting method may be chosen based on a damage level of the locally damaged portion 302. In some embodiments, the cutting method may include, but not limited to, computer numerical control (CNC) milling, abrasive jet cutting, pulsed laser cutting, and/or the like. In alternative embodiments, rotary saw blades or oscillating saw blades with thickness gauges may also be utilized for cutting the bullet portion 402 from the rest of the bullet 404. If the damage level is high, grinding tools may be utilized to remove the bullet portion 402. Hand tools, such as diamond coated cutting knifes, may assist the cutting process.

In the illustrated embodiments described hereinafter with reference to FIGS. 5A-11B, the composite blade 100 is shown horizontally, i.e., a longitudinal length of the composite blade is along a horizontal direction. Front and rear views of the composite blade 100 may be taken from pressure and suction sides, respectively, of the composite blade 100. FIG. 5A illustrates a schematic front view of a portion of the composite blade 100 including the locally damaged portion 302. FIG. 5B illustrates a schematic rear view of a portion of the composite blade 100 including the locally damaged portion 302. FIG. 5C illustrates a schematic sectional view of the composite blade 100 taken along a section line I-I' shown in FIG. 5A.

Referring now to FIGS. 2, 5A and 5C, at step 206, the method 200 further includes detaching a first wing portion 502 corresponding to the locally damaged portion 302 from a rest of the first wing 504. Specifically, the first wing portion 502 is detached along lines D-D' and E-E'.

In some embodiments, detaching the first wing portion 502 further includes cutting the first wing portion 502 from the rest of the first wing 504 while leaving the composite part 104 intact. In some embodiments, any of the cutting methods described above may be utilized for cutting the first wing portion 502 from the rest of the first wing 504.

Referring now to FIGS. 2, 5B and 5C, at step 208, the method 200 further includes detaching a second wing portion 506 corresponding to the locally damaged portion 302 from a rest of the second wing 508. Specifically, the second wing portion 506 is detached along lines F-F' and G-G'. In some embodiments, detaching the second wing portion 506 further includes cutting the second wing portion 506 from the rest of the second wing 508 while leaving the composite part 104 intact. In some embodiments, any of the cutting methods described above may be utilized for cutting the second wing portion 506 from the rest of the second wing 508.

Figure 6A:
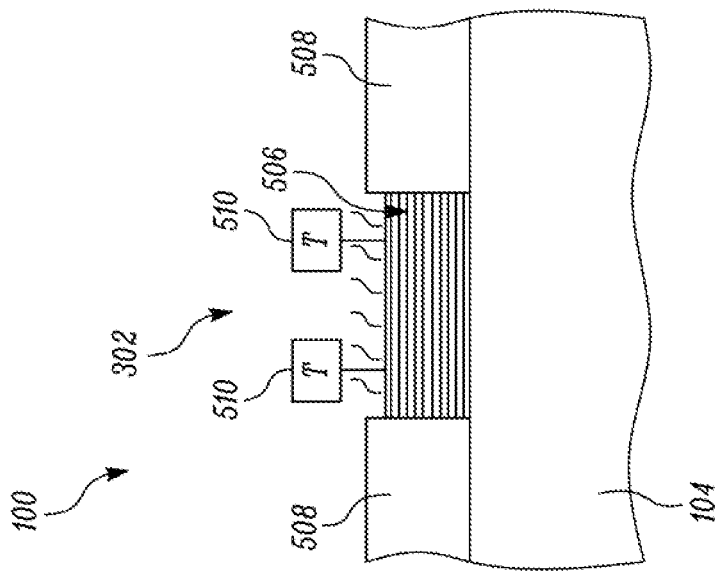
FIG. 6A is a schematic front view of a portion of the composite blade where a first wing portion corresponding to the locally damaged portion is heated.

FIG. 6A illustrates a schematic front view of a portion of the composite blade 100 including the locally damaged portion 302. Referring now to FIGS. 2 and 6A, at step 210, the method 200 further includes debonding and removing the first wing portion 502 from the composite part 104 to obtain a first exposed surface portion 602 (shown in FIG. 9A) of the composite part 104. In other words, the first wing portion 502 is removed from the composite part 104 corresponding to the locally damaged portion 302 to obtain the first exposed surface portion 602 (shown in FIG. 9A) of the composite part 102.

In some embodiments, debonding and removing the first wing portion 502 further includes heating at least the first wing portion 502 to a temperature equal to or above a predetermined threshold temperature T (e.g., 120° C. or 140° C.). Heating at least the first wing portion 502 may reduce a bond strength of the adhesive layer 118 between the first wing portion 502 and the composite part 104. In the illustrated example of FIG. 6A, the temperature of the first wing portion 502 is measured using one or more thermocouples 510 coupled to the first wing portion 502. In some other embodiments, the temperature of the first wing portion 502 may be measured using thermal cameras for non-invasive temperature measurements.

In some embodiments, the temperature T may correspond to a glass transition temperature of the adhesive used in the adhesive layer 118 (shown in FIGS. 1B and 5C). Further, the heating temperature may be lower than a glass transition temperature of an underlying elastomer layer (e.g., the elastomer layer 126 shown in FIG. 1B) and the composite part 104 to avoid any damage to them.

In some embodiments, heating may be performed using electric heating lamps or one or more heating blankets. For example, the one or more heating blankets may be placed over the first wing portion 502 such that heat may be transferred from the one or more heating blankets to the first wing portion 502. The one or more heating blankets are flexible and may conform to a shape of the locally damaged portion 302.

Figure 6B:
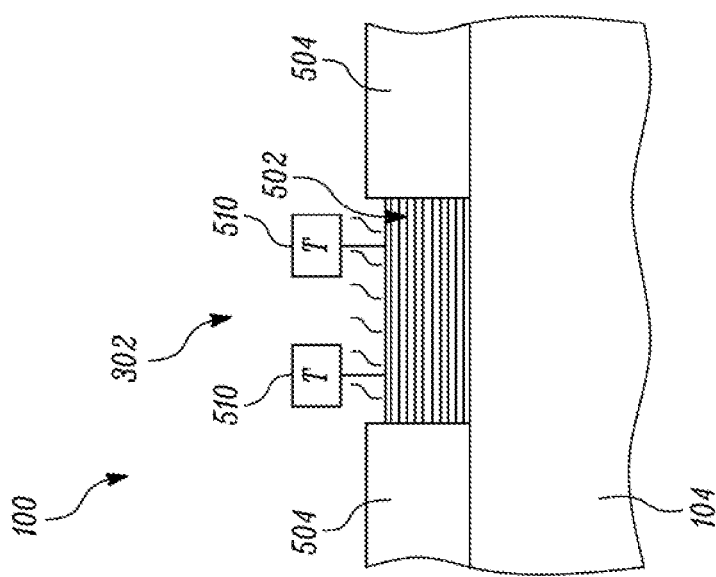
FIG. 6B is a schematic rear view of a portion of the composite blade where a second wing portion corresponding to the locally damaged portion is heated.

FIG. 6B illustrates a schematic rear view of a portion of the composite blade 100 including the locally damaged portion 302. Referring now to FIGS. 2 and 6B, at step 212, the method 200 further includes debonding and removing the second wing portion 506 from the composite part 104 to obtain a second exposed surface portion 604 (shown in FIG. 9B) of the composite part 102.

In some embodiments, debonding and removing the second wing portion 506 further includes heating at least the second wing portion 506 to a temperature equal to or above the predetermined threshold temperature T. In the illustrated example of FIG. 6A, the temperature of the second wing portion 506 is measured using the one or more thermocouples 510 coupled to the second wing portion 506. In some other embodiments, the temperature of the second wing portion 506 may be measured using thermal cameras for non-invasive temperature measurements. In some embodiments, the second wing portion 506 may be heated in the similar manner as that of the first wing portion 502. Further, one or more heating blankets may be used to cover both the first wing portion 502 and the second wing portion 506 simultaneously.

FIG. 7A illustrates a schematic front view of the locally damaged portion 302. FIG. 7B illustrates a schematic sectional view of the locally damaged portion 302 and the composite part 104 taken along a section line K-K' shown in FIG. 7A. Referring now to FIGS. 2, 7A and 7B, debonding and removing the first wing portion 502 further includes initiating, using a sharp-edged tool 702, a crack 704 (shown in FIG. 7B) in the adhesive layer 118 disposed adjacent to the first wing portion 502. The sharp-edged tool 702 is interchangeably referred to hereinafter as "the tool 702". In some embodiments, the crack 704 may be initiated from a top edge of the locally damaged portion 302 towards the composite part 104. The crack 704 may lift an edge of the first wing portion 502 away from the composite part 104. In some embodiments, the sharp-edged tool 702 is a chisel made of at least one of a metal, a plastic, and an elastomer. In some embodiments, a metal chisel is used to initiate the crack 704.

In some embodiments, initiating the crack 704 in the adhesive layer 118 disposed adjacent to the first wing portion 502 further includes using a mallet 706 to strike the sharp-edged tool 702. For example, the tool 702 may include a sharp and thin edge in the form of a wedge and striking the tool 702 with the mallet 706 against the adhesive layer 118 causes the crack 704 to appear in the adhesive layer 118 that is preheated. In some embodiments, the mallet 706 may be made of rubber or any other suitable material that allows a soft blow to the tool 702.

A high intensity localised cleavage stress in the form of the crack 704 may be generated in the adhesive layer 118 by forcing the thin edge of the wedge into the adhesive layer 118 with low impact force through the mallet 706. The crack 704 may be an initial crack in the adhesive layer 118. In some embodiments, debonding and removing the first wing portion 502 further includes debonding, using the sharp-edged tool 702, the first wing portion 502 from the composite part 104.

Heating the first wing portion 502 allows transition of a failure mode of the adhesive layer 118 from composite failure to cohesive failure. Thus, the first wing portion 502 may be deboned from the composite part 104 such that cohesive failure occurs within the adhesive layer 118 thereby protecting the composite part 104 and the adjacent elastomer layers (e.g., the elastomer layer 126 shown in FIG. 1B). Further, heating the first wing portion 502 and forcing the thin edge of the wedge may allow the crack 704 to propagate quickly through the adhesive layer 118.

Similarly, the second wing portion 506 may also be removed using the tool 702. FIG. 7C illustrates a schematic rear view of the locally damaged portion 302. Referring now to FIGS. 2, 7B and 7C, debonding and removing the second wing portion 506 further includes initiating, using the sharp-edged tool 702, a crack 708 in the adhesive layer 118 disposed adjacent to the second wing portion 506.

In some embodiments, initiating the crack 708 in the adhesive layer 118 disposed adjacent to the second wing portion 506 further includes using the mallet 706 to strike the sharp-edged tool 702. Striking the tool 702 with the mallet 706 against the adhesive layer 118 disposed adjacent to the second wing portion 506 causes the crack 708 to appear in the adhesive layer 118 that is preheated. In some embodiments, debonding and removing the second wing portion 506 further includes debonding, using the sharp-edged tool 702, the second wing portion 506 from the composite part 104.

FIG. 8A illustrates a schematic front view of the locally damaged portion 302. FIG. 8B illustrates a schematic sectional view of the locally damaged portion 302 and the composite part 104 taken along a section line M-M' shown in FIG. 8A. Referring now to FIGS. 2, 8A and 8B, debonding the first wing portion 502 from the composite part 104 further includes progressively inserting the sharp-edged tool 702 (along a direction P) in the adhesive layer 118 disposed adjacent to the first wing portion 502 so as to debond the first wing portion 502 from the composite part 104. Thus, after initiating the crack 704 (shown in FIG. 7B) using the tool 702, another tool 703 (e.g., a plastic bevel chisel) may be inserted in the adhesive layer 118 disposed adjacent to the first wing portion 502 to further advance the crack 704 and progressively debond the first wing portion 502 from the composite part 104. In some embodiments, the tool 703 may be similar to the tool 702.

Progressively inserting the tool 702 in the adhesive layer 118 disposed adjacent to the first wing portion 502 may be performed while heating the first wing portion 502 and maintaining the temperature of the first wing portion 502 equal to or above the predetermined threshold temperature T.

In some embodiments, the plastic bevel chisel with the flat surface facing the composite part 104 may be inserted into the adhesive layer 118 disposed adjacent to the first wing portion 502 through the crack 704 (shown in FIG. 7B) using the mallet 706.

Progressive insertion of the tool 702 may allow further propagation of the crack 704. This process may be continued until the entire first wing portion 502 is debonded from the composite part 104.

The plastic bevel chisel may operate as a sacrificial article that chips off in an event of excessive manually controlled impact force on the plastic bevel chisel, and thus, preventing any damage to the underlying layers (e.g., the composite part 104).

Similarly, the second wing portion 506 may also be removed using the tool 702. FIG. 8C illustrates a schematic rear view of the locally damaged portion 302. Referring now to FIGS. 2, 8B and 8C, debonding the second wing portion 506 from the composite part 104 further includes progressively inserting the sharp-edged tool 702 (along a direction Q) in the adhesive layer 118 disposed adjacent to the second wing portion 506 so as to debond the second wing portion 506 from the composite part 104. Thus, after initiating the crack 708 (shown in FIG. 7B) using the tool 702, another tool 703 may be inserted in the adhesive layer 118 disposed adjacent to the second wing portion 506 to progressively debond the second wing portion 506 from the composite part 104.

In alternative embodiments, the partially debonded first wing portion 502 (shown in FIG. 8A) or the second wing portion 506 may be clamped into a tool and a tensile force (nearly perpendicular to a plane of the corresponding adhesive layer 118) may be applied. This will generate sufficient cleavage tensile stresses at the corresponding adhesive layer 118 to debond the remaining bonded area. Thus, the operation of the tools 702, 703 (e.g., the chisels) may be minimized to create only a small debonding region.

Figure 9B:
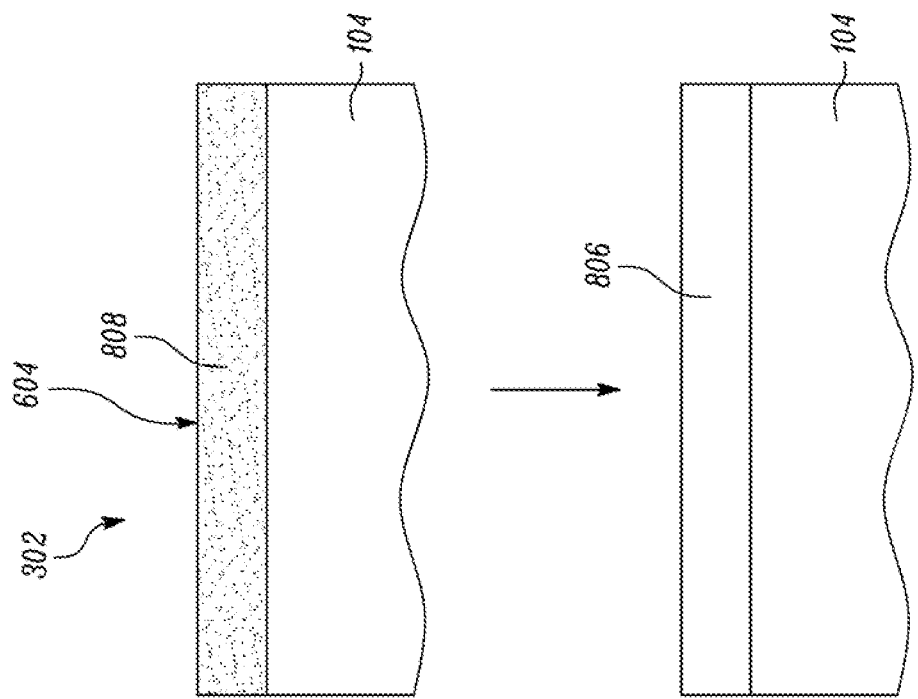
FIG. 9B is a schematic rear view of the locally damaged portion where a second exposed surface portion is reconditioned to obtain a second reconditioned surface portion.
Figure 9A:
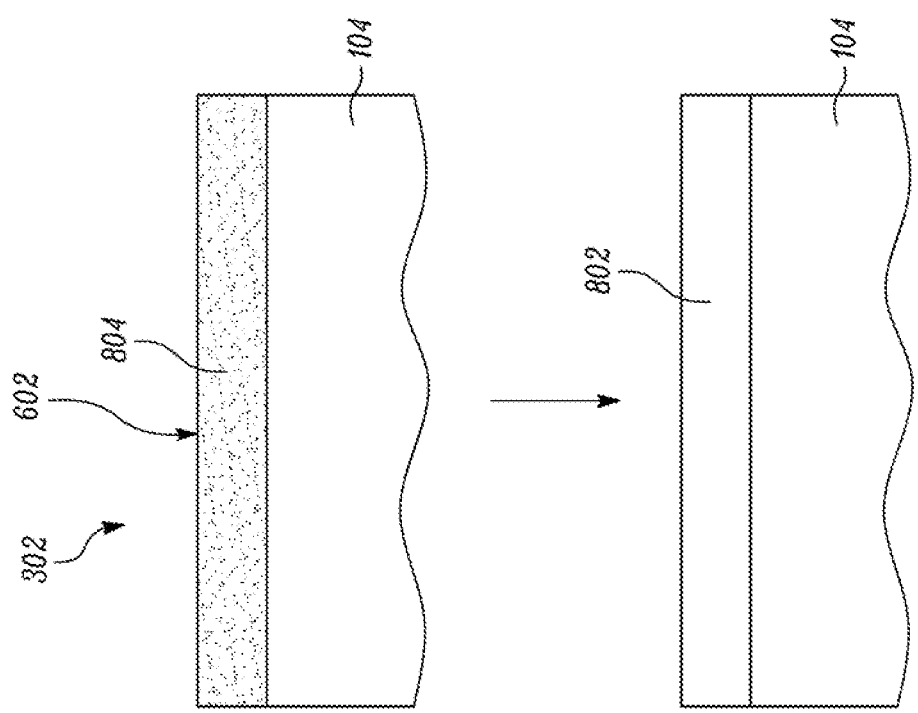
FIG. 9A is a schematic front view of the locally damaged portion where a first exposed surface portion is reconditioned to obtain a first reconditioned surface portion.

FIGS. 9A and 9B illustrate schematic front and rear views of the locally damaged portion 302, respectively. Specifically, FIGS. 9A and 9B illustrate the first exposed surface portion 602 and the second exposed surface portion 604 corresponding to the first wing portion 502 and the second wing portion 506, respectively. The first exposed surface portion 602 and the second exposed surface portion 604 are obtained after debonding the corresponding first wing portion 502 and the second wing portion 506 from the composite part 104. Referring now to FIGS. 2 and 9A, at step 214, the method 200 further includes reconditioning the first exposed surface portion 602 of the composite part 104 to obtain a first reconditioned surface portion 802 of the composite part 104.

In some embodiments, reconditioning the first exposed surface portion 602 further includes removing any residual adhesive layer 804 from the first exposed surface portion 602. The residual adhesive layer 804 may be left on the composite part 104 after debonding the first wing portion 502 from the composite part 104. The left-over adhesive on the first exposed surface portion 602 may include peaks and valleys that may not be suitable for rebonding with a new metal insert. Thus, the first exposed surface portion 602 may first need to be reconditioned properly to eliminate generation of any voids in a rebonded joint with the new metal insert.

Various techniques known in the art may be selected for removing the residual adhesive layer 804 from the composite part 104 based on a measured amount of the residual adhesive in the residual adhesive layer 804. For example, the residual adhesive may be removed using sandpapers, abrasive discs and/or wet grit blasting method generally known in the art.

In alternative embodiments, reconditioning the first exposed surface portion 602 further includes applying a mixture comprising an adhesive and at least one volatile solvent (e.g., acetone) to the first exposed surface portion 602. In this manner, the mixture may fill the uneven residual adhesive layer 804 to form an even surface. Reconditioning the first exposed surface portion 602 further includes heating (e.g., to temperatures above 40° C. to 60° C.) the first exposed surface portion 602 to eliminate the at least one volatile solvent, thus, obtaining the first reconditioned surface portion 802. After this step, the first exposed surface portion 602 may become tacky such that a fresh adhesive layer may be applied on the first reconditioned surface portion 802. Elastomer layers (e.g., the elastomer layer 126 shown in FIG. 1B) of the composite part 104 may be damaged during this step. Thus, the elastomeric layers may be removed locally and replaced with a new layer.

Referring now to FIGS. 2 and 9B, at step 216, the method 200 further includes reconditioning the second exposed surface portion 604 of the composite part 104 to obtain a second reconditioned surface portion 806 of the composite part 104. In some embodiments, reconditioning the second exposed surface portion 604 further includes removing any residual adhesive layer 808 from the second exposed surface portion 604. The second reconditioned surface portion 806 may be obtained in the similar manner as the first reconditioned surface portion 802 described above.

In some embodiments, reconditioning the second exposed surface portion 604 further includes applying a mixture comprising an adhesive and at least one volatile solvent to the second exposed surface portion 604. Reconditioning the second exposed surface portion 604 further includes heating the second exposed surface portion 604 to eliminate the at least one volatile solvent, thus, obtaining the second reconditioned surface portion 806.

Figure 10B:
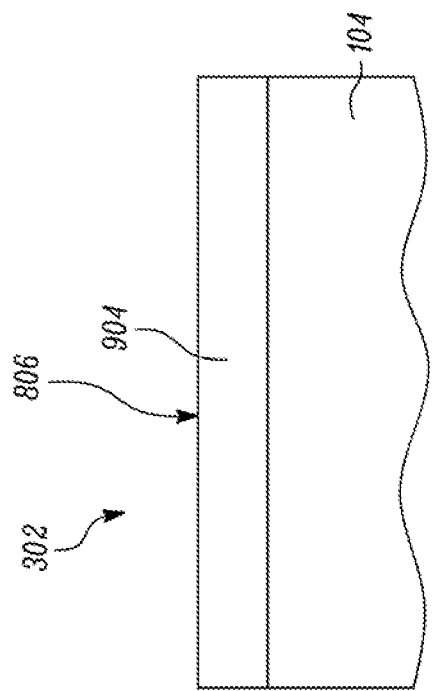
FIG. 10B is a schematic rear view of the locally damaged portion where a second adhesive layer is applied to the second reconditioned surface portion.
Figure 10A:
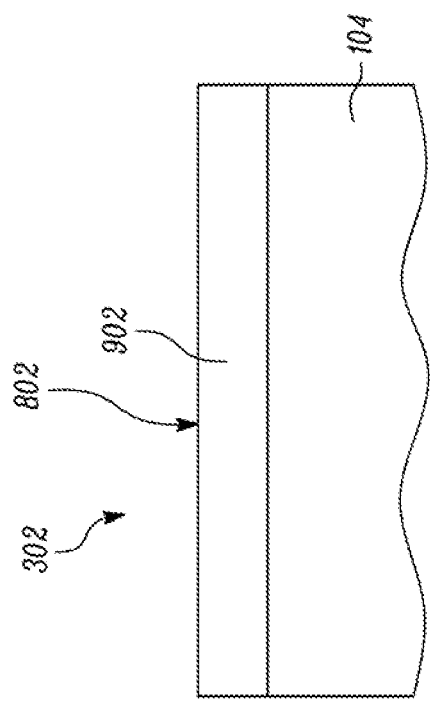
FIG. 10A is a schematic front view of the locally damaged portion where a first adhesive layer is applied to the first reconditioned surface portion.

FIGS. 10A and 10B illustrate schematic front and rear views of the locally damaged portion 302, respectively. Specifically, FIGS. 10A and 10B illustrate the first reconditioned surface portion 802 and the second reconditioned surface portion 806, respectively. The first reconditioned surface portion 802 and the second reconditioned surface portion 806 are obtained after reconditioning the first exposed surface portion 602 and the second exposed surface portion 604, respectively.

Referring now to FIGS. 2 and 10A, at step 218, the method 200 further includes applying a first adhesive layer 902 to the first reconditioned surface portion 802. In some embodiments, the first adhesive layer 902 may include the same adhesive as the adhesive layer 118 (shown in FIG. 1B). Referring now to FIGS. 2 and 10B, at step 220, the method 200 further includes applying a second adhesive layer 904 to the second reconditioned surface portion 806. In some embodiments, the second adhesive layer 904 may include the same adhesive as the adhesive layer 118 (shown in FIG. 1B). In some examples, the first and second adhesive layers 902, 904 may be in the form of a film or paste.

FIGS. 11A and 11B illustrate schematic front view and rear view of a portion of the composite blade 100, respectively. Referring now to FIGS. 2, 11A and 11B, at step 222, the method 200 further includes bonding a metal work patch 906 to the first adhesive layer 902 (shown in FIG. 10A) and the second adhesive layer 904 (shown in FIG. 10B). The metal work patch 906 may be identical to the locally damaged portion 302 (shown in FIG. 3).

In some examples, the metal work patch 906 may be readily available based on a damage history of the composite blade 100. For example, severe erosions on a leading edge (e.g., the leading edge 108) of the composite blade 100 may be a commonly found damage that requires local repair at times. In some embodiments, the metal work patch 906 may be additively manufactured based on the information from a three-dimensional (3D) scanner.

FIG. 11C illustrates a partial sectional view of the metal work patch 906 and the composite part 104 taken along a section line H-H' shown in FIG. 11A. Referring now to FIGS. 11A-11C, the metal work patch 906 includes a bullet part 908 corresponding to the bullet portion 402 (shown in FIG. 4), a first wing part 910 corresponding to the first wing portion 502 (shown in FIG. 5A), and a second wing part 912 corresponding to the second wing portion 506 (shown in FIG. 5B). Thus, the metal work patch 906 may entirely replace the locally damaged portion 302 (shown in FIG. 3).

In some embodiments, an additional adhesive layer 914 may be applied on an outermost edge of the composite part 104 before bonding the metal work patch 906. The adhesive layer 914 may include similar adhesive as that of the first adhesive layer 902 or the second adhesive layer 904.

In some embodiments, the bonding the metal work patch 906 to the first adhesive layer 902 and the second adhesive layer 904 further includes curing the first adhesive layer 902 and the second adhesive layer 904. Curing may allow the first adhesive layer 902 and the second adhesive layer 904 to attain their final adhesive properties.

In some embodiments, the metal work patch 906 may be bonded to the composite blade 100 by obtaining a butt or scarf joint with the rest of the composite blade 100, e.g., the rest of the bullet 404 (shown in FIG. 4), the rest of the first wing 504, and the rest of the second wing 508. The metal work patch 906 may be cured inside a mould such that the metal work patch 906 is flush with the rest of the bullet 404 (shown in FIG. 4), the rest of the first wing 504, and the rest of the second wing 508. This may maintain integrity of the leading edge of the composite blade 100.

In some embodiments, the bullet part 908, the first wing part 910, and the second wing part 912 may be joined with adjacent metal portions, i.e., the rest of the bullet 404 (shown in FIG. 4), the rest of the first wing 504, and the rest of the second wing 508 through any of the known joining methods, e.g., local spot welding, fusion bonding or any other method that may avoid any heat damage to the underlying composite part 104.

Referring now to FIGS. 1A-11C, the method 200 may allow local repair of the composite blade 100, thus avoiding replacement of the entire metal work 106a, 106b. Further, the repair may be restricted to a small region of the composite blade 100 only, i.e., the locally damaged portion 302, allowing manual debonding of the locally damaged portion 302, and eliminating the need for any sophisticated tool or complex debonding process.

While the description of the method of the present disclosure is with reference to a turbine fan blade, it should be understood that this method is equally applicable to other aerofoils, including vanes, propellers, rotor blades (e.g., for helicopters), as well as other types of turbine blades that include composite blades with metal work.

It will be understood that the present disclosure is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A method of repairing a composite blade comprising a composite part, a metal work, and an adhesive layer bonding the metal work to the composite part, the metal work comprising a bullet forming a leading edge of the composite blade, a first wing extending from the bullet, and a second wing extending from the bullet and opposing the first wing, the method comprising the steps of:
    determining a locally damaged portion of the metal work;
    removing a bullet portion corresponding to the locally damaged portion from a rest of the bullet;
    detaching a first wing portion corresponding to the locally damaged portion from a rest of the first wing;
    detaching a second wing portion corresponding to the locally damaged portion from a rest of the second wing;
    debonding and removing the first wing portion from the composite part to obtain a first exposed surface portion of the composite part;
    debonding and removing the second wing portion from the composite part to obtain a second exposed surface portion of the composite part;
    reconditioning the first exposed surface portion of the composite part to obtain a first reconditioned surface portion of the composite part;
    reconditioning the second exposed surface portion of the composite part to obtain a second reconditioned surface portion of the composite part;
    applying a first adhesive layer to the first reconditioned surface portion;
    applying a second adhesive layer to the second reconditioned surface portion; and
    bonding a metal work patch to the first adhesive layer and the second adhesive layer, wherein the metal work patch comprises a bullet part corresponding to the bullet portion, a first wing part corresponding to the first wing portion, and a second wing part corresponding to the second wing portion.

2. The method of claim 1, further comprising applying an adhesive tape adjacent to the locally damaged portion to highlight the locally damaged portion.

3. The method of claim 1, wherein removing the bullet portion further comprises cutting the bullet portion from the rest of the bullet.

4. The method of claim 1, wherein detaching the first wing portion further comprises cutting the first wing portion from the rest of the first wing while leaving the composite part intact.

5. The method of claim 1, wherein detaching the second wing portion further comprises cutting the second wing portion from the rest of the second wing while leaving the composite part intact.

6. The method of claim 1, wherein debonding and removing the first wing portion further comprises heating at least the first wing portion to a temperature equal to or above a predetermined threshold temperature, and wherein debonding and removing the second wing portion further comprises heating at least the second wing portion to a temperature equal to or above the predetermined threshold temperature.

7. The method of claim 1, wherein debonding and removing the first wing portion further comprises:
    initiating, using a sharp-edged tool, a crack in the adhesive layer disposed adjacent to the first wing portion; and
    debonding, using the sharp-edged tool, the first wing portion from the composite part.

8. The method of claim 7, wherein debonding and removing the second wing portion further comprises:
    initiating, using the sharp-edged tool, a crack in the adhesive layer disposed adjacent to the second wing portion; and
    debonding, using the sharp-edged tool, the second wing portion from the composite part.

9. The method of claim 8, wherein initiating the crack in the adhesive layer disposed adjacent to the first wing portion or the second wing portion further comprises using a mallet to strike the sharp-edged tool.

10. The method of claim 7, wherein debonding the first wing portion or the second wing portion from the composite part further comprises progressively inserting the sharp-edged tool in the adhesive layer disposed adjacent to the corresponding first wing portion or the second wing so as to debond the first wing portion or the second wing portion from the composite part.

11. The method of claim 7, wherein the sharp-edged tool is a chisel made of at least one of a metal, a plastic, and an elastomer.

12. The method of claim 1, wherein reconditioning the first exposed surface portion further comprises removing any residual adhesive layer from the first exposed surface portion.

13. The method of claim 1, wherein reconditioning the second exposed surface portion further comprises removing any residual adhesive layer from the second exposed surface portion.

14. The method of claim 1, wherein reconditioning the first exposed surface portion or the second exposed surface portion further comprises:
    applying a mixture comprising an adhesive and at least one volatile solvent to the first exposed surface portion or the second exposed surface portion; and
    heating the first exposed surface portion or the second exposed surface portion to eliminate the at least one volatile solvent.

15. The method of claim 1, wherein bonding the metal work patch to the first adhesive layer and the second adhesive layer further comprises curing the first adhesive layer and the second adhesive layer.

* * * * *